United States Patent
Briltz et al.

(10) Patent No.: US 6,932,905 B2
(45) Date of Patent: Aug. 23, 2005

(54) WATER TREATMENT SYSTEM

(75) Inventors: Raymond P. Briltz, Regina (CA); Robert J. Hubbard, Brandon (CA)

(73) Assignee: Home Farms Technologies Inc., Brandon (CA)

( * ) Notice: Subject to any disclaimer, the term of this patent is extended or adjusted under 35 U.S.C. 154(b) by 0 days.

(21) Appl. No.: 10/241,010

(22) Filed: Sep. 10, 2002

(65) Prior Publication Data

US 2003/0070973 A1 Apr. 17, 2003

Related U.S. Application Data

(60) Provisional application No. 60/317,999, filed on Sep. 10, 2001.

(51) Int. Cl.[7] .................................................. C02F 1/52
(52) U.S. Cl. ..................... 210/199; 210/202; 210/748; 204/673; 366/169.1; 366/170.3
(58) Field of Search ................................. 210/199, 202, 210/748; 204/665, 672, 673; 366/169.1, 169.2, 170.3, 172.1

(56) References Cited

U.S. PATENT DOCUMENTS

| 3,841,483 A | | 10/1974 | Overton |
| 3,920,550 A | * | 11/1975 | Farrell et al. ................. 210/86 |
| 4,710,290 A | * | 12/1987 | Briltz ......................... 210/199 |
| 5,124,035 A | | 6/1992 | Dunne et al. |
| 5,900,154 A | | 5/1999 | Henriksen |
| 5,993,670 A | * | 11/1999 | Knauer ........................ 210/738 |

FOREIGN PATENT DOCUMENTS

| DE | 4029824 A1 | * | 3/1992 | ............ B01F/5/00 |
| JP | 58008520 | | 1/1983 | |
| WO | WO 00/73215 | | 12/2000 | |

* cited by examiner

*Primary Examiner*—Duane Smith
*Assistant Examiner*—Douglas J. Theisen
(74) *Attorney, Agent, or Firm*—Michael R. Williams; Adrian D. Battison; Ryan W. Dupuis

(57) ABSTRACT

A water treatment apparatus includes a mixing tube through which the waste water passes for mixing into the waste water a plurality of chemicals for causing flocculation of contaminants. The mixing tube is connected to a settling chamber for allowing settling of the flocculated contaminants and for supplying clarified water at an outlet of the settling chamber. The mixing tube has a plurality of injection members at spaced positions along the duct, each including a pump and a chemical supply for injecting a selected quantity of a selected chemical into the duct and each including a respective mixing member and drive for mixing the chemical into the water in the duct. An electrical separation section is provided in the system before or after the settling and includes a duct, into which the water is introduced and a plurality of amorphous metal plates across the duct arranged to be charged at low voltage.

20 Claims, 9 Drawing Sheets

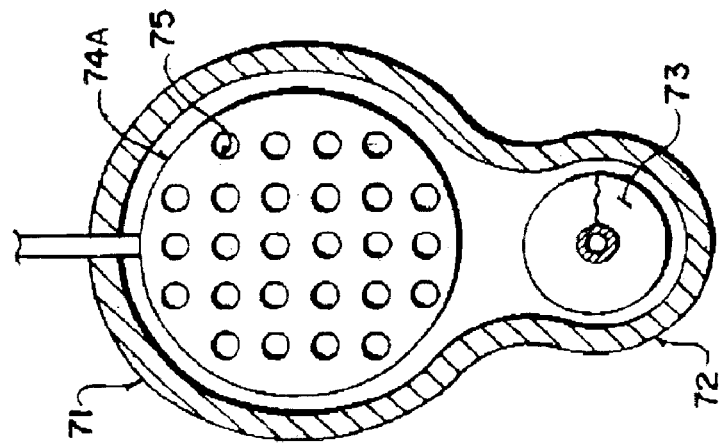
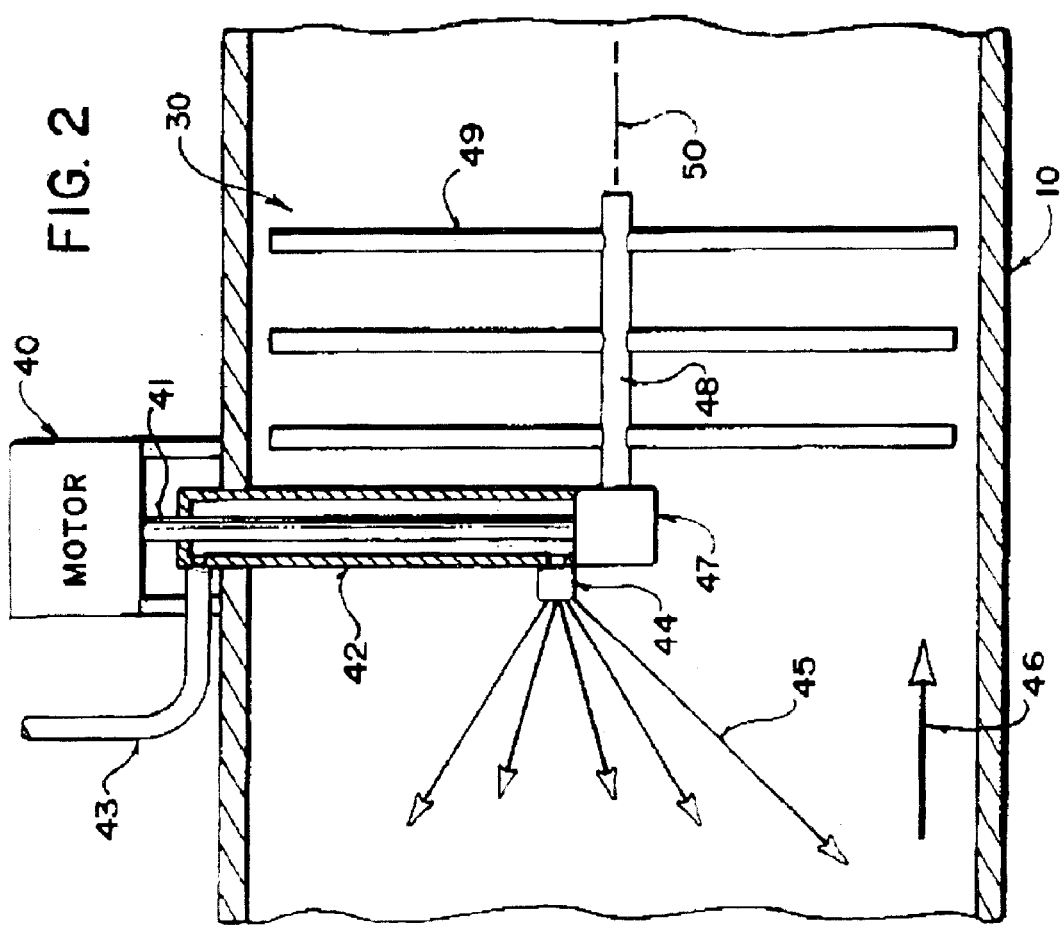

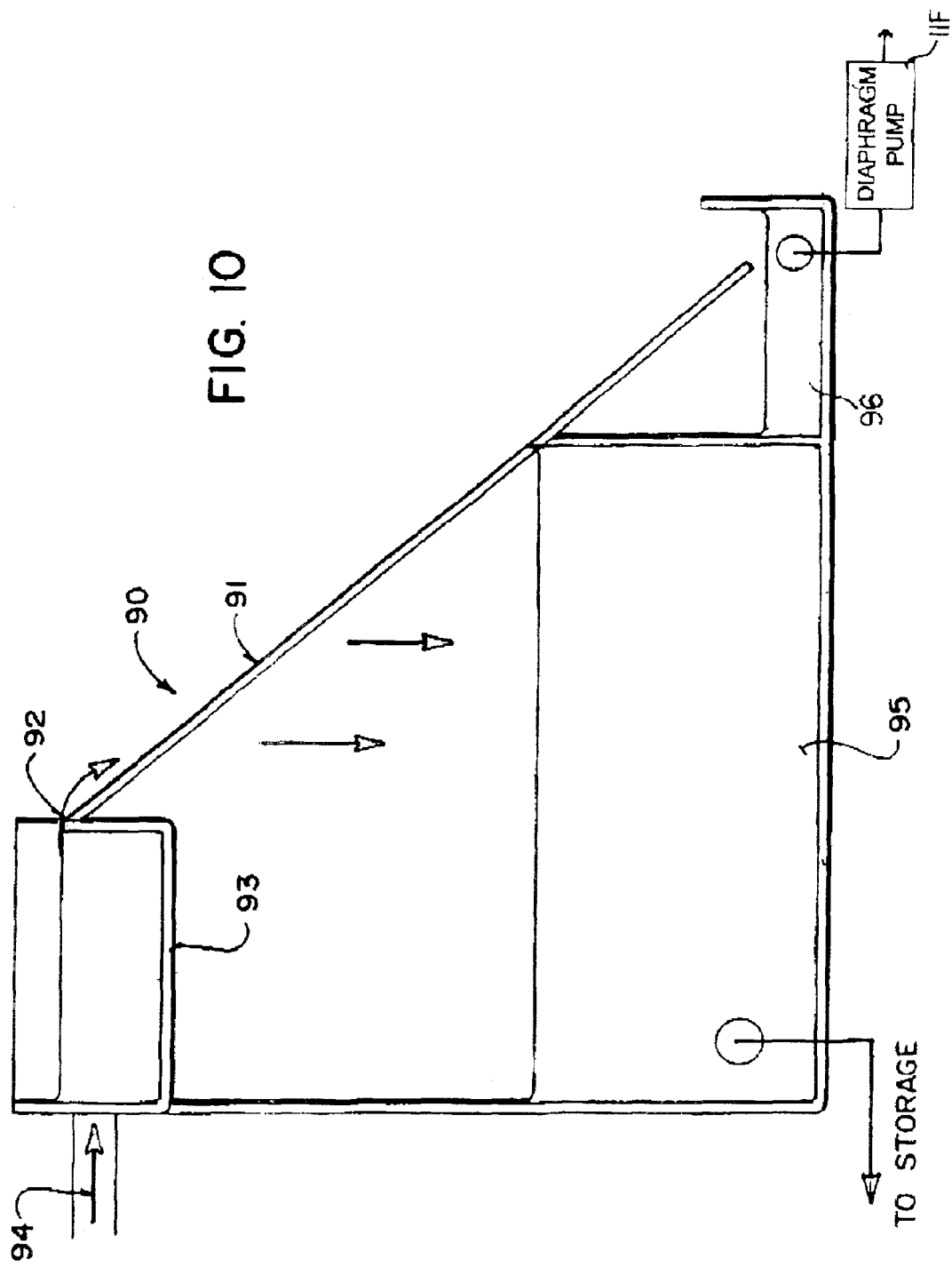

WATER TREATMENT SYSTEM

CROSS-REFERENCE TO RELATED APPLICATION

The present application claims the benefit under 35 U.S.C. Section 119(e) of provisional patent application Ser. No. 60/317,999, filed on Sep. 10, 2001, the contents of which are hereby incorporated by reference.

This invention relates to an apparatus for removing contaminants from water.

BACKGROUND OF THE INVENTION

It is known to add various chemicals to waste water in settling tanks in which the chemicals act to flocculate the contaminants so that they can settle for collection at the bottom of the settling tank leaving clarified water to be removed from the top of the settling tank. Conventionally this takes several hours of settling so that the tanks must be very large in order to accommodate a significant flow through.

One arrangement intended to allow settling of the materials within a few minutes thus reducing the size of the equipment necessary is shown in the prior U.S. Pat. No. 4,710,290 of one of the inventors herein Briltz. This arrangement has achieved some success and provides a tubular mixing chamber into which the waste water is injected and within which is provided a plurality of chemical injectors at spaced positions along the length of the duct. Also along the duct is provided a plurality of mixing devices which rotate within the duct so as to ensure that the chemicals are properly mixed in the water. It will be appreciated that the mixing is highly important since it is necessary for the chemicals to mix intimately with the contaminants within the water to ensure that the flocculation occurs quickly in order to achieve the short dwell time within the system.

Downstream of the mixing chamber is provided a settling tank which can be very small allowing a dwell time of only a few minutes in view of the fact that the highly effective mixing has previously occurred so that the flocculation occurs immediately the materials enter the settling tank.

SUMMARY OF THE INVENTION

It is one object of the present invention to provide an improved water treatment apparatus.

The mixing system shown in the above patent has significant mechanical and functional problems and therefore it is one object of the present invention to provide an improved mixing chamber.

It is a further object of the present invention to provide an improved system in which, after the flocculation and settling, a further operation is applied to the water to further remove contaminants subsequent to or prior to filtering.

According to a first aspect of the invention there is provided an apparatus for water treatment comprising:

an inlet for waste water to be treated;

a mixing tube assembly for receiving the waste water from the inlet and through which the waste water passes to an outlet of the mixing tube assembly for mixing into the waste water a plurality of chemicals for causing flocculation of contaminants in the waste water;

and a separating chamber connected to the outlet of the mixing tube assembly for receiving the waste water and the chemicals mixed therein for allowing settling of the flocculated contaminants and for supplying clarified water at an outlet of the separating chamber;

wherein the mixing tube assembly comprises:

a duct with an inlet at one end and the outlet at the other end;

a plurality of injection members at spaced positions along the duct each including a pump and a chemical supply for injecting a selected quantity of a selected chemical into the duct;

and a plurality of mixing members in the duct at spaced positions therealong arranged such that each injection member is associated with a respective mixing member for mixing the chemical into the water in the duct;

Preferably each of the mixing members comprises a motor mounted on an outside of the duct, a drive shaft of the motor extending from the motor through a wall of the duct in a direction generally at right angles to the duct, a body driven by the shaft for rotation within the duct including a plurality of beater paddles or blades thereon and a chemical injector mounted on the duct at the shaft for receiving chemical and injecting the chemicals into the water within the duct.

Preferably the chemicals are injected at the drive shaft.

Preferably the chemicals are injected through a hollow interior of the drive shaft.

Preferably the chemicals are injected through a tube surrounding the drive shaft drive shaft.

Preferably the chemicals are injected through a fixed nozzle connected to the tube surrounding the drive shaft drive shaft.

Preferably the chemicals are injected through a rotating body attached to the drive shaft.

In one preferred arrangement, the separating chamber is formed by a settling tank which includes an inlet at one end connected to the outlet of the mixing tube assembly, an outlet of the settling chamber at an opposed end at an upper part of the chamber such that clarified water at a top part of the chamber can be drawn off, and a sludge removal system at a bottom of the settling chamber for removing the flocculated contaminants, the settling chamber being shaped such that the flocculated contaminants collect at the sludge removal system for discharge;

In another preferred arrangement, the separating chamber comprises an inclined perforated screen with a water supply system at the top edge of the screen for receiving water and contaminants from the mixing chamber and supplying them across the screen for flowing over the screen, a sludge collecting tank at a bottom edge of the screen and a water collection tank underneath the screen for collecting water passing through the screen. The screen is preferably a wedge wire screen.

Preferably there is provided a filter system for filtering the clarified water from the outlet of the settling chamber.

Preferably there is provided an electrical separation assembly comprising a container into which the water is introduced and a plurality of plates within the container arranged to be charged at low voltage; the plates being formed of an amorphous metal.

Preferably the plates are parallel.

Preferably the plates are arranged across a duct with holes through the plates for passage of water along the duct.

Preferably the duct has an auger along a bottom part of the duct for removal of collected sludge.

Preferably the plates are arranged in groups where each alternate group is oppositely charged.

Preferably the charge is at the order of 12 volts.

According to a second aspect of the invention there is provided an apparatus for water treatment comprising:

an inlet for waste water to be treated;

a mixing tube assembly for receiving the waste water from the inlet and through which the waste water passes to an outlet of the mixing tube assembly for mixing into the waste water a plurality of chemicals for causing flocculation of contaminants in the waste water;

and a settling chamber connected to the outlet of the mixing tube assembly for receiving the waste water and the chemicals mixed therein for allowing settling of the flocculated contaminants and for supplying clarified water at an outlet of the settling chamber;

wherein there is provided an electrical separation assembly comprising a container into which the water is introduced and a plurality of plates within the container arranged to be charged at low voltage; the plates being formed of an amorphous metal.

BRIEF DESCRIPTION OF THE DRAWINGS

One embodiment of the invention will now be described in conjunction with the accompanying drawings in which:

FIG. 2 is an enlarged view of one arrangement of injector head for use in the apparatus of FIG. 1.

FIG. 7 is a front elevational view of one plate of the electrical system of FIG. 6.

FIG. 10 is a vertical cross-sectional view through a modified settling tank construction for use in replacement for the tank 11 of FIG. 1.

In the drawings like characters of reference indicate corresponding parts in the different figures.

DETAILED DESCRIPTION

In general the apparatus disclosed herein includes a Rapid Physical/Chemical Reactor and an Electric Magnetic Variable Frequency Generator. These components can be used together or as separate systems. When used together, this combined apparatus can be used to purify water from any source including sewage, industrial wastes, etc.. The system can be used to remove all pollutants in water and restore the water to its natural potable state. The entire process is done on a continuously flowing pressurized inline system and is complete in a manner of minutes.

The system comprises a compact and modular unit and requires no holding time due to the continuous flow through operation. This results in low operating and maintenance costs making it one of the most unique systems in the market today.

The reactor is a unique and advanced means of rapidly mixing various types of chemicals inline. This causes an instant chemical reaction that releases all particulates suspended or in solution in the water. Once this occurs, they are activated to produce flocculation to produce a heavy mass which drops freely from the water to the bottom of the dropout chamber where it can be removed.

The clear water is taken off the top header of the outlet end of the chamber. This water is then passed through a mixed media tank for polishing and the end result is high quality and potable water.

The compact and modular design of the system and rapid flow through requires no holding time therefore is very economical to operate and maintain.

This is a modular compact system requiring no holding time thereby reducing operating and maintenance costs to produce a very economical and unique system in today's market.

Figure 1:
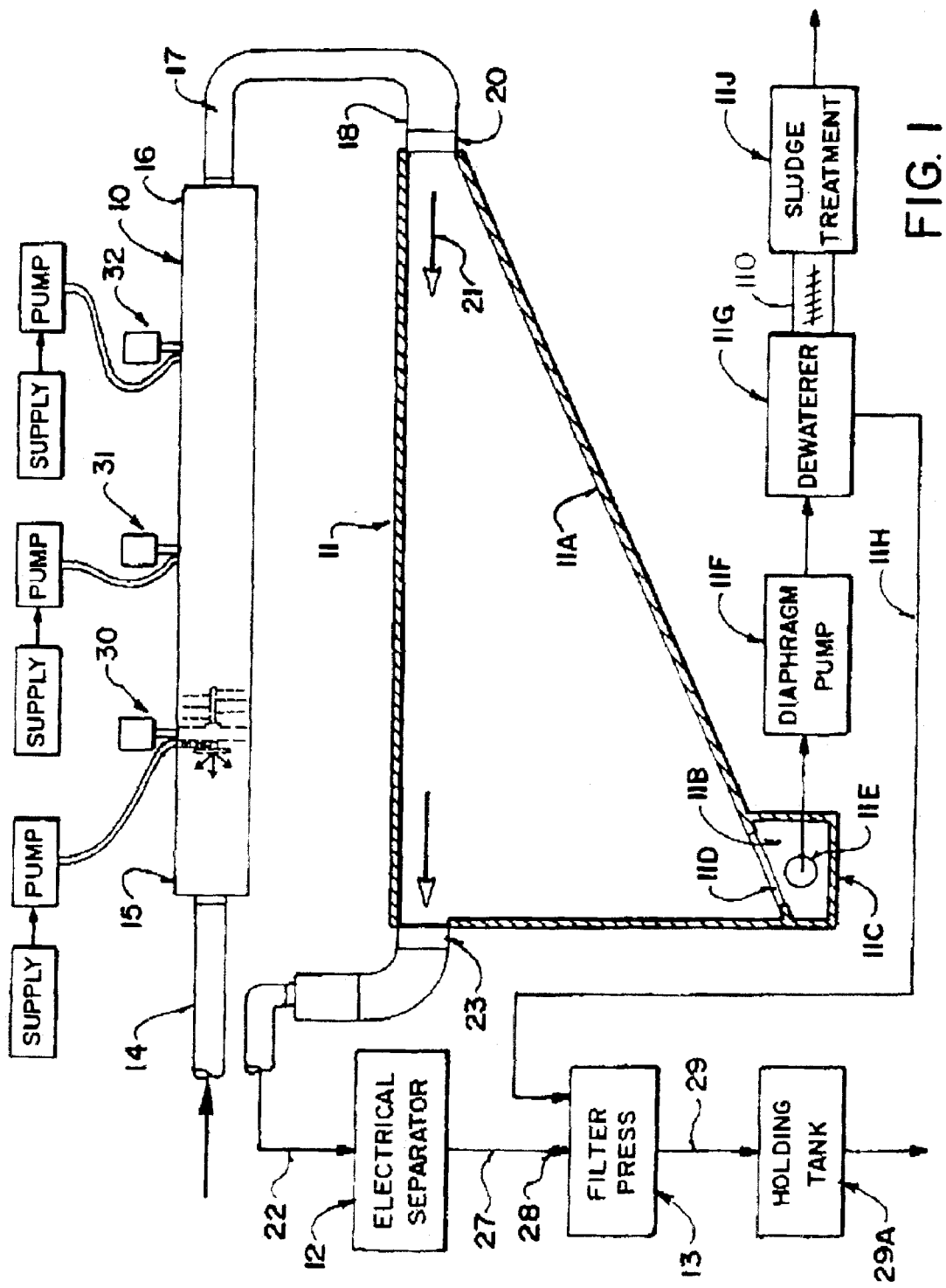
FIG. 1 is a side elevational view of an apparatus for treating waste water according to the present invention.
Figure 5:
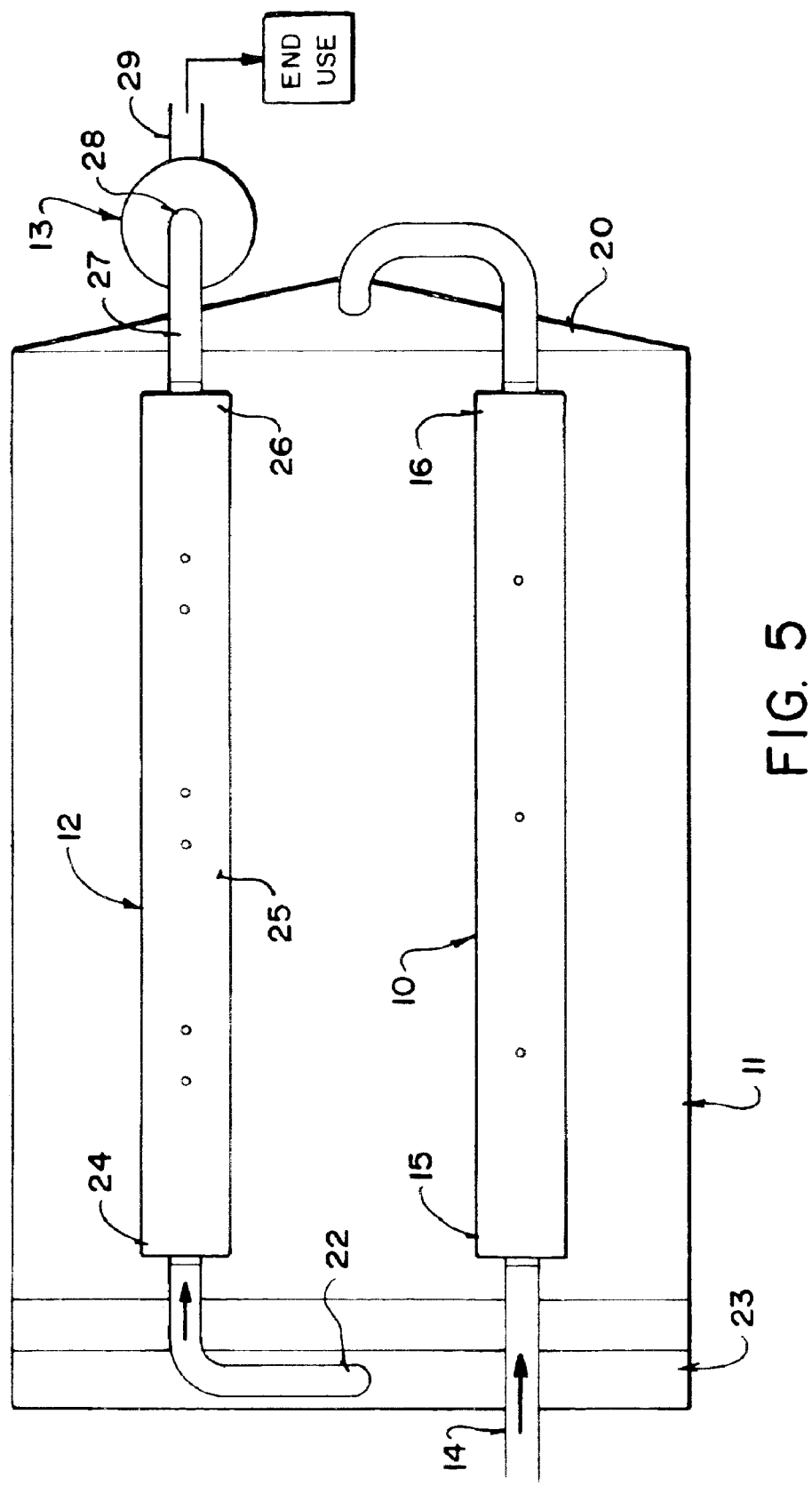
FIG. 5 is a top plan view of the apparatus of FIG. 1.

In FIGS. 1 and 5 is shown the structure of the complete apparatus which includes a mixing chamber 10, a settling tank 11, a subsequent electrical separation duct 12 and a filter press 13.

Water from an inlet 14 is injected to one end 15 of the mixing chamber 10 and extends along the mixing chamber 10 to a discharge end 16. At the discharge end 16, the mixed chemicals and water passes through a duct 17 to an inlet 18 of the settling chamber 11 which is located underneath the mixing chamber 10. The settling chamber 11 comprises in effect a tank with a header 20 at the inlet spreading the water and chemicals in mixed form across the width of the tank so that the mixture enters the top of the tank and generally passes across the top of the tank in a flow 21 to a discharge outlet 22 at a header 23. From the outlet 22, the clarified water enters an inlet end 24 of the electrical system 12 which includes a duct 25 along which the liquid passes to an outlet end 26. At the outlet end the water passes through a duct 27 to an inlet 28 of the filter 13 and from the filter 13 to an outlet duct 29 for supply to an end use container or holding tank 29A or further system (not shown).

The tank 11 has an inclined bottom wall 11A inclined downwardly and forwardly from the inlet header 20 to the bottom 11B of the tank where is provided a sludge removal system within a bottom container 11C below the bottom wall 11A. The bottom wall has a series of transversely spaced holes 11D across its width to allow passage of the sludge through the holes from the tank 11 into the bottom container 11C. The sludge is drawn off from the container 11C into an outlet duct 11E by a pump 11F to a dewatering screw 11G. Water from the dewaterer is transported to the filter 13 through a duct 11H while the sludge goes to a treatment system 11J. The sludge removal from the tank 11 can be carried by an auger 110. The unit, as shown, may be modified to improve the de-watering and exiting process of the residue solid sludge. The modifications may be one or a combination of the following concepts and programs:

A unit that centrifugally separates the fluid from the residue solid sludge and convey it into a holding tank;

A pump that extracts the residue solid sludge from the egress tubing and transport it via conveyor piping to a holding tank;

A unit that moves the residue solid sludge via conveyor to a squeeze and screening process.

A roller device that squeezes and de-waters the residue solid sludge.

In the mixing chamber 10 is provided a plurality of injector heads 30, 31 and 32 although of course this number may be varied in accordance with requirements. Three separate chemicals each from a respective supply can be provided and injected into the duct forming the chamber 10. Prior to injection, the chemicals are selected on the basis of conventional trials which determine from the composition of the waste water the best collection of chemicals in the best order and at the required amounts by setting up a series of trials on small samples of the waste water.

A preferred arrangement for the injector head 30 is shown in FIG. 2. This comprises a motor 40 having an output drive shaft 41. A tube 42 is mounted on the duct 10 so as to project into the interior of the duct 10. The tube 42 is connected to a supply duct 43 from the pump of the chemical concerned. At the bottom of the tube 42 is provided one or more injection nozzles 44 which are arranged to jet the chemical in a spray pattern 45 injected forwardly along the duct toward the oncoming liquid as shown at 46. At the bottom of the tube 42 is mounted a gear box 47 to which the shaft 41 connects. Thus the gear box 47 is carried within the duct 10 on the bottom of the tube. The gear box carries a shaft 48 which projects rearwardly along the duct in the direction of flow of the liquid 46. The gear box acts to change the direction of drive of the shaft 41 into the right angle shaft 48 which lies along the axis of the duct 10. The shaft 48 carries a plurality of beater or paddle blades 49 which project radially outwardly at spaced positions along the length of the shaft so that rotation of the shaft around the axis 50 of the duct the chemicals are thus spread into the water 46 ahead of the injector head and the chemicals and water when they reach the mixing blades 49 are mixed vigorously by the rotation of the shaft 48 so that the blades forma shearing action in the water and chemicals to effect a mixing action.

Figure 3:
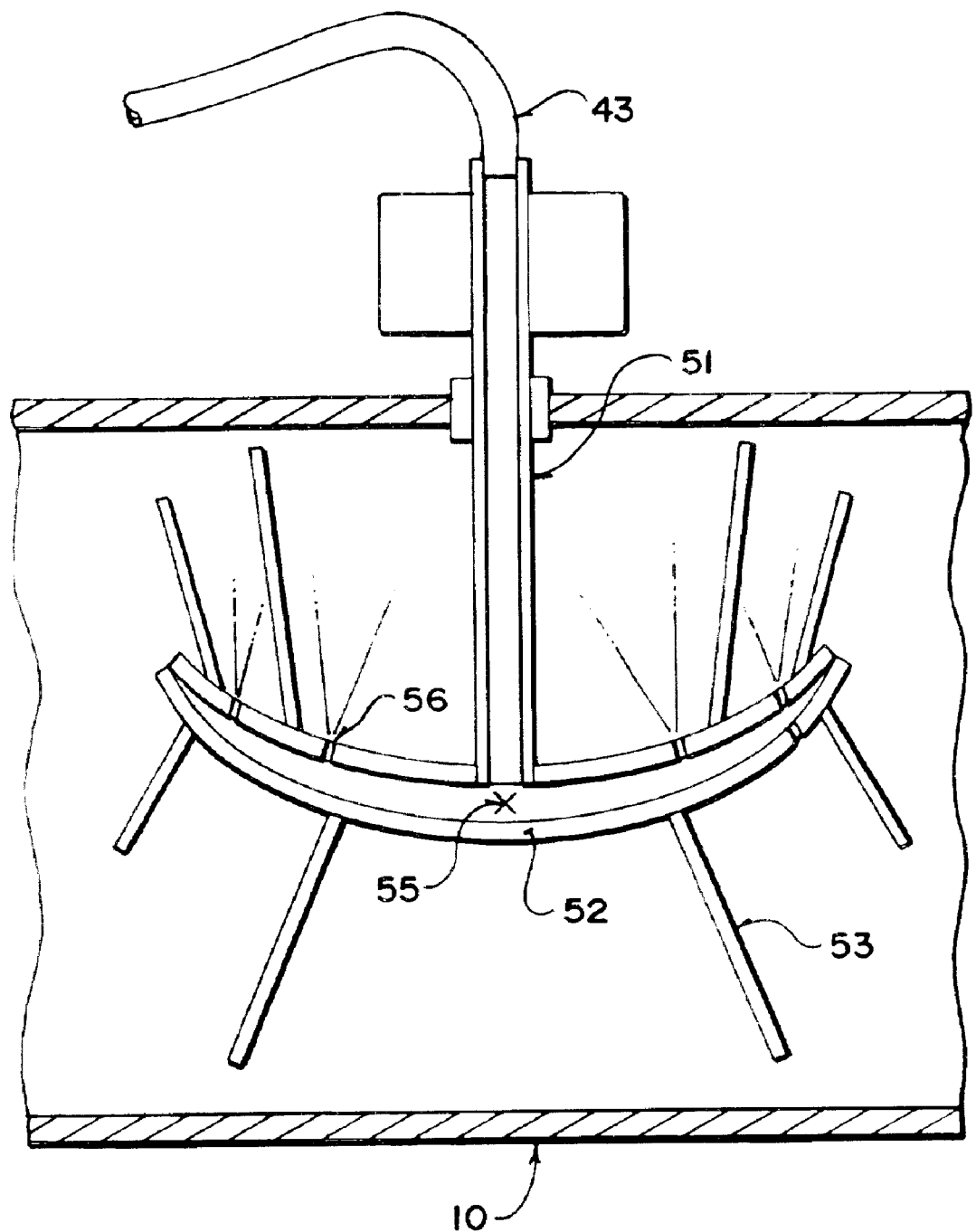
FIG. 3 is an enlarged view of a second arrangement of injector head.

In FIG. 3 is shown an alternative arrangement of mixing head where the shaft 51 of the motor is hollow so that the supply 43 passes through the hollow shaft into a hollow dish member 52 at the bottom of the shaft. The dish member sits at the center of the duct 10 generally at the axis and the dish member carries a plurality of generally outwardly extending blades or paddles 53 which project toward the inside surface of the duct 10. The blades or paddles project also generally outwardly from a center of the dish indicated at 55 about which the dish rotates by rotation of the shaft 51 driven by the motor. The dish has a plurality of outlet openings or nozzles 56 through which the chemicals escape into the interior onto the top of and possibly underneath the dish.

Figure 4:
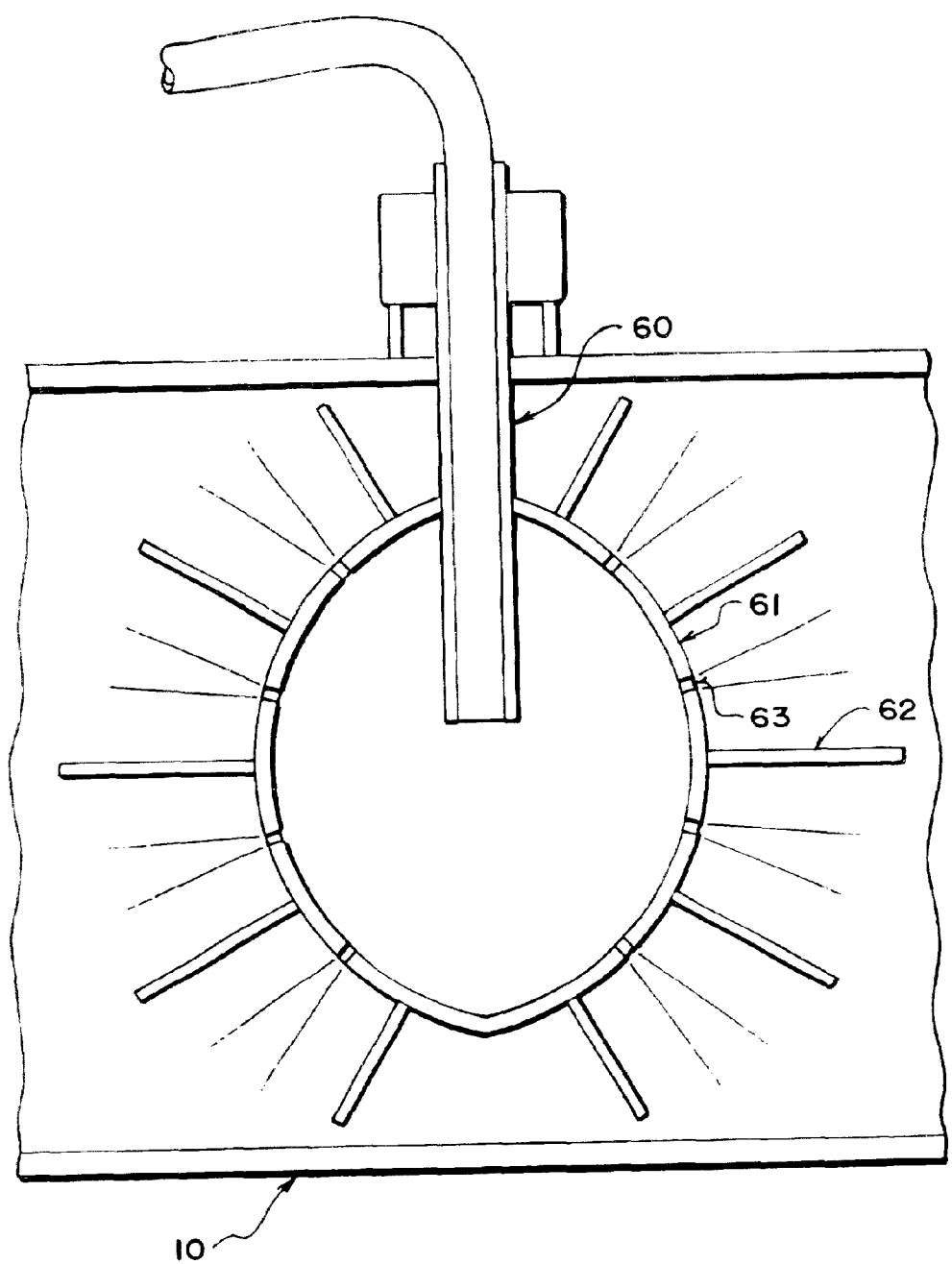
FIG. 4 is an enlarged view of a third arrangement of injector head.

In FIG. 4 is shown a further arrangement which again includes a hollow shaft 60 driven by a motor and supplied by the supply from the pump. At the bottom of the hollow shaft 60 is provided a hollow body 61 again carrying blades 62 and jet nozzles 63 so that the chemicals are injected into the water within the duct 10 while the blades rotate and effect a mixing action.

The arrangement described above provides simple injector heads which can be readily and simply mounted into the duct requiring only simple sealing at the wall of the duct.

The unit is equipped with sensors S and monitoring devices M that constantly measure and record specific data pertaining to the nutrient, mineral and chemical content of the fluids and solids as they are entering the unit, during the flocculation process in the unit and exiting the unit. Such data includes, but is not limited to, the following:

Ammonia
Chemical Oxygen Demand
Clariforms
Color
Conductivity
Dissolved Oxygen
Nitrates
Nitrites
Nitrogen
pH
Phosphates
Total Alkalinity
Total Dissolved Solids
Total Suspended Solids
Turbidity Suitable metering devices for metering the above parameters are commercially available from various sources and are well known to one skilled in the art.

Figure 6:
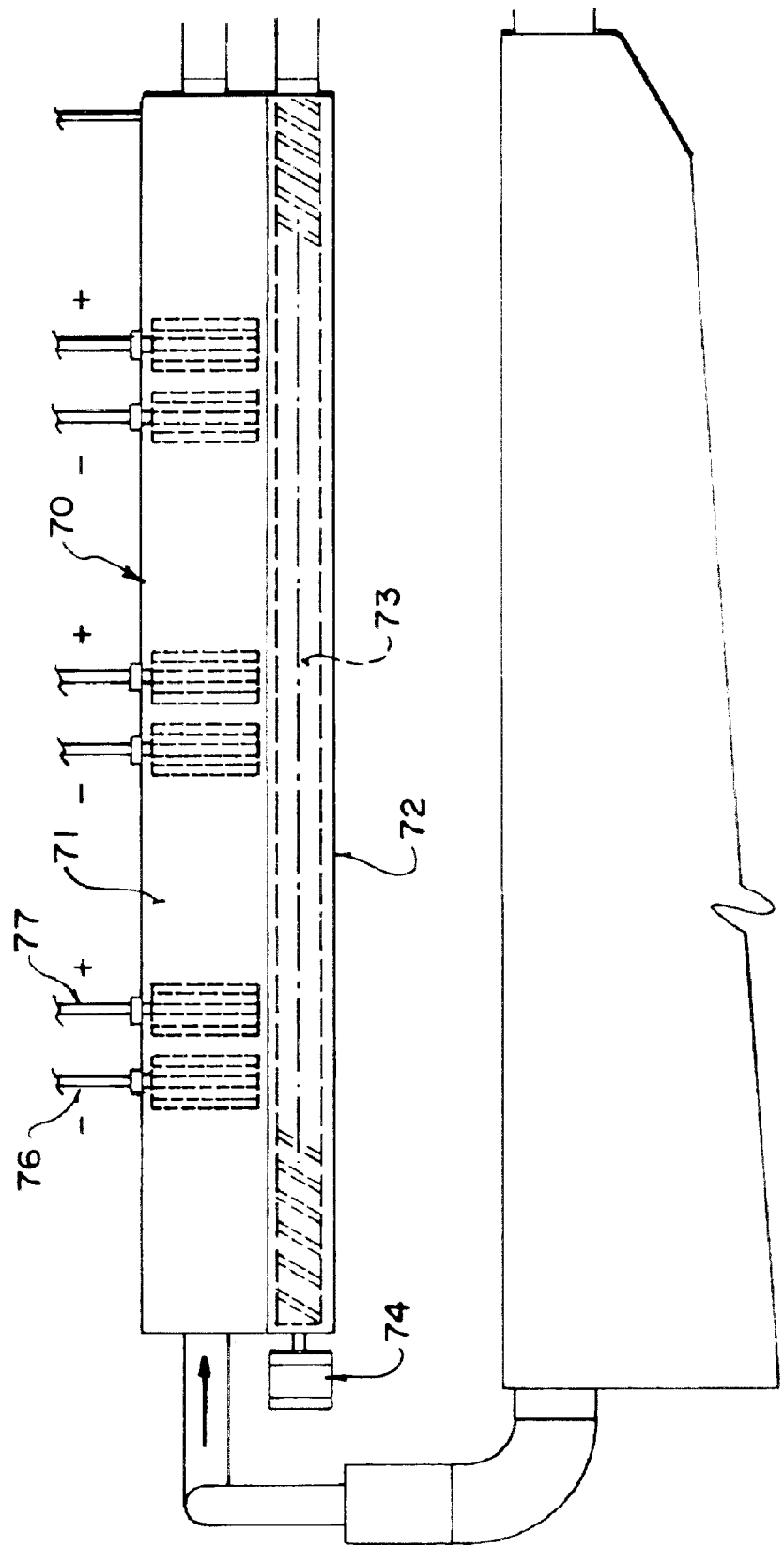
FIG. 6 is a longitudinal cross sectional view through an electrical separation system of the apparatus of FIG. 1.

In FIGS. 6 and 7 is shown more detail of the electrical separator in which there is a plurality of plates each formed from amorphous metal and mounted within the duct 70. The duct includes an upper cylindrical part 71 and a lower cylindrical part 72 connected to the upper part and of a smaller diameter so that an auger 73 is provided at the lower cylindrical part and driven by a motor 74 so as to carry collective materials along the lower duct part to the discharge end. The plates are generally circular defining a circular outer edge 74A and a plurality of holes 75 through the plate arranged in a pattern or array of rows and columns. The plates are arranged in groups of six plates with each group connected to a respective electrical supply coupling 76 and 77 to provide a voltage difference between the groups of plates of approximately 12 volts. The plates are spaced each from the next by a short distance, which is just sufficient to prevent contact between the plates should any warping occur which is of the order of ⅜ inches. The plates have a thickness of the order of ⅛ to ⅜ inches. The plates generally match in shape the inside surface of the duct with only a narrow spacing from the inner surface so that the water primarily or wholly passes through the holes in the plates. The holes in the plates may be misaligned so as to cause a labyrinth effect so that the water is caused to move within the duct as it passes through the series of plates one after the other. The selection of an amorphous metal provides a surprising effect on the water which causes the deposition from the water of contaminants so that the contaminants fall downwardly from the plates and collect at the lower area 72. Amorphous metal is well known as a conductor, primarily for transformers and the like where high currents are required and is available from many sources. Examples or amorphous metals are shown in U.S. Pat. No. 3,856,513 (Chen et al) re-issued May 16$^{th}$ 1989; U.S. Pat. No. 5,342,648 (MacKenzie) issued Aug. 30th 1994; and U.S. Pat. No. 6,296,948 (Ames) issued Oct. 2nd 2001.

This electric magnetic generator is very unique. The plates are constructed from amorphous metal or any equal quality product.

Charging the metals with a low voltage (D.C.) charge causes a chemical reaction that causes all heavy metals, minerals, salts, chlorides, etc. to be released from the water. This is done by placing 12 plates of different sizes with ⅜" to ½" holes through the face of the plates and then suspending them inside a tube or pipe and then charging them through posts outside the pipe with a 12-volt D.C. battery. While charged, the water is then flowed through the plates to create an instant chemical reaction causing all pollutants locked in the water to be released. A slight gas, hydrogen, is released and vented off the pipe. The solids are then dropped to the bottom of the chamber by charging the solids with the chemical reactor causing an instant flocculating action to bring all suspended materials together. They become heavy and rapidly drop to the bottom of the drop out chamber. The treated clear water is taken off the top of the outlet header and passed through a mixed media filter producing a high quality, potable water. This process can be performed in a stationary tank also. The sludge is removed off the bottom and de-watered.

Figure 8:
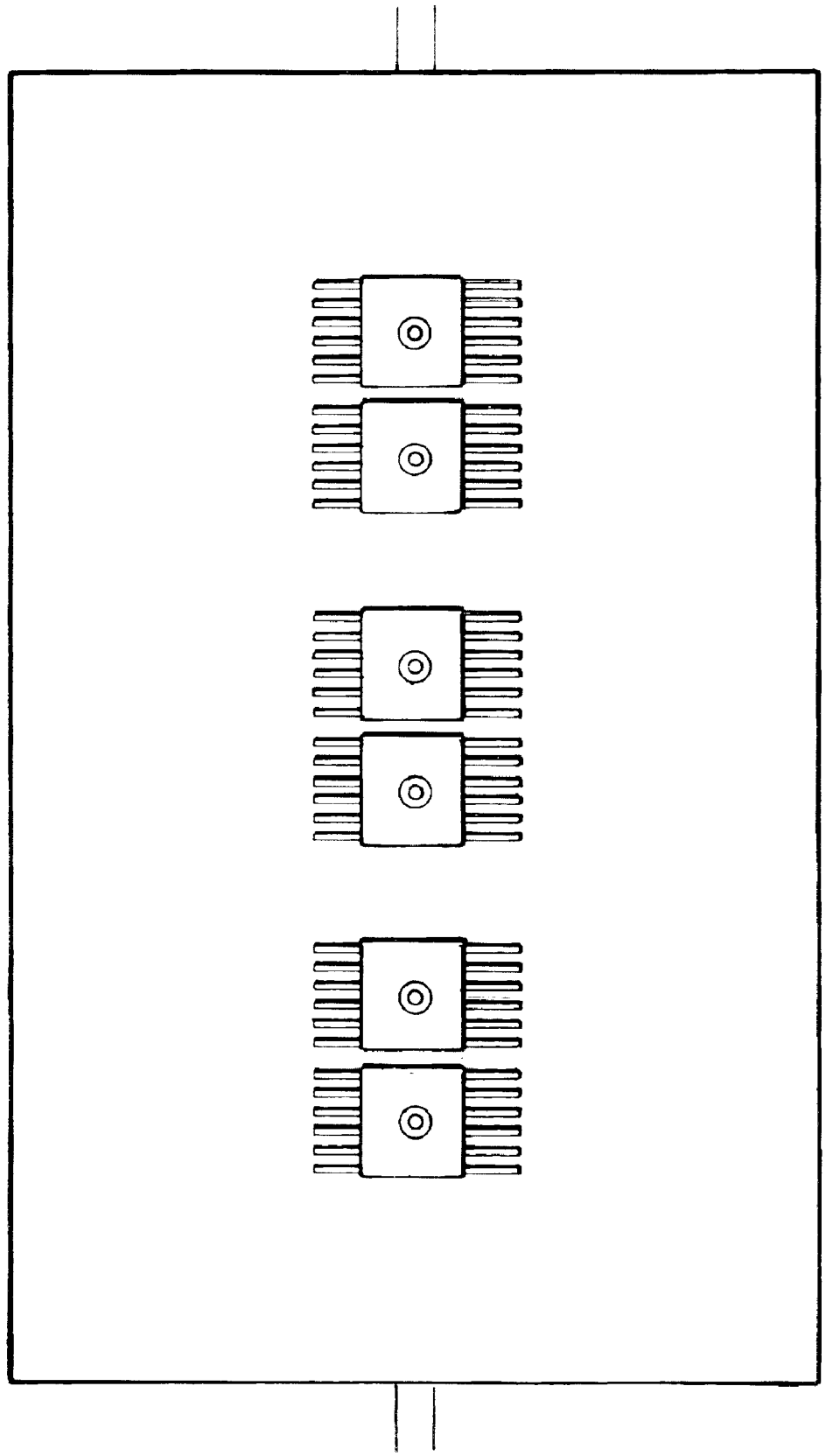
FIG. 8 is a top plan view of a modified arrangement for the apparatus of FIG. 1 in which the electrical system is effected in a tank as opposed to the duct arrangement of FIG. 6.
Figure 9:
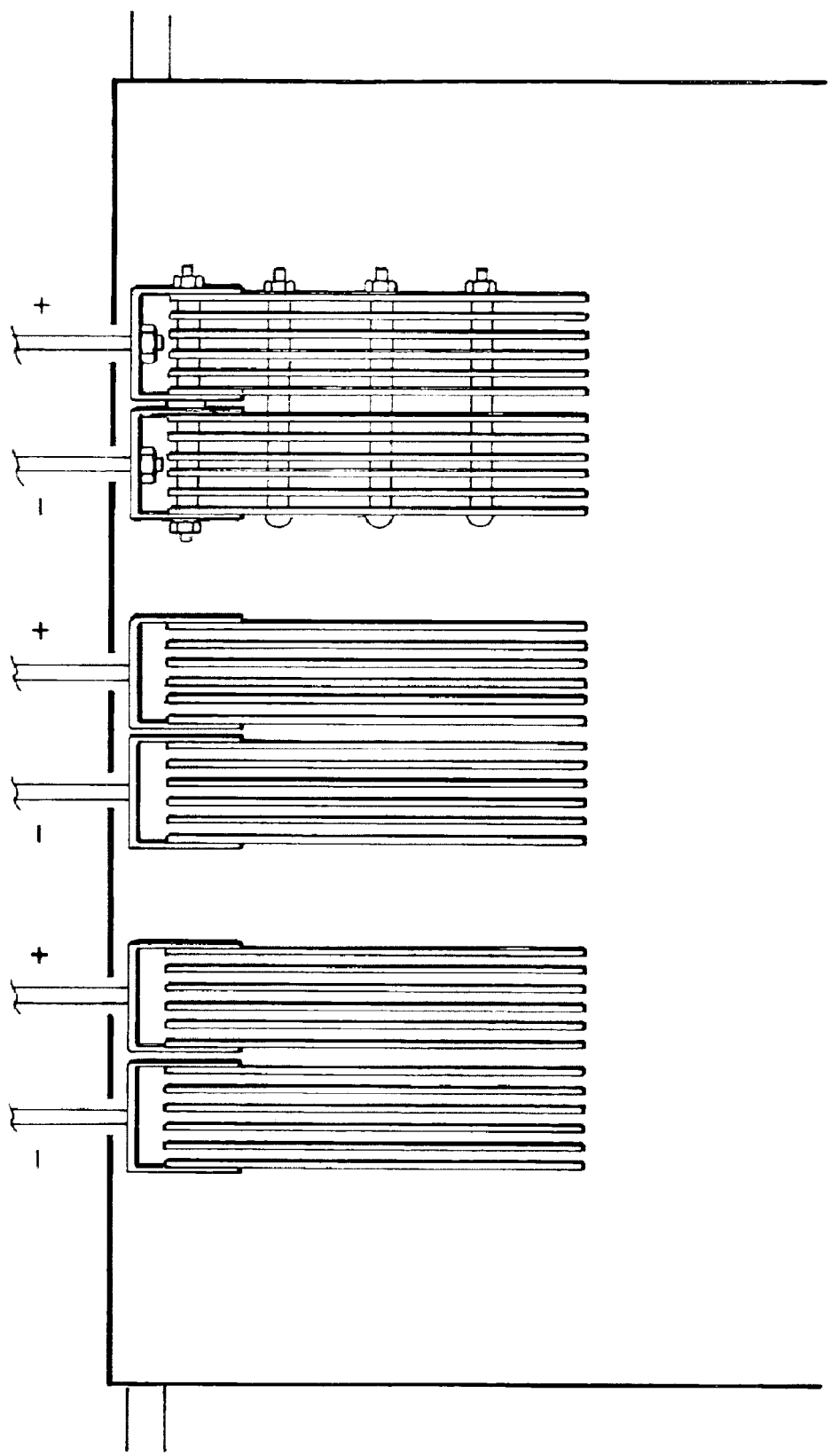
FIG. 9 is a longitudinal cross sectional view of the tank of FIG. 8.

Turning to FIGS. 8 and 9, there is shown an alternative arrangement wherein the same plates are formed in larger surface area and located within a settling tank with an auger at the bottom. Thus the water within the settling tank stays stationary rather than the flowing duct arrangement of FIGS. 6 and 7 giving a greater time period for the action by the alternately charged amorphous metal plates. The plates of FIGS. 8 and 9 may be solid without the necessity for holes since there is no flow through the plates but the plates are instead simply hanging within the water in the settling tank.

The electrical separation may be effected prior to or subsequent to the chemical reaction system. As shown in the above embodiment the electrical separation occurs downstream of the chemical separation tank 11. However in particularly contaminated conditions or saline conditions, the electrical separation unit, in stationary or flow mode may be used in advance of the chemical system.

Relative to the arrangement shown above, a number of modifications (not shown) can be made as follows:

The header partition of the unit can be modified in pitch and shaping for improved drop and separation of the solid particles.

The reactor section of the unit can be modified to monitor via multiple sensor devices the pH factor and other chemistry valuations of the incoming raw fluid to assure chemical consistency throughout the Reactor Process.

The unit can be modified to provide for a slide-in module that will accommodate the pre-mixed formulation of any and all chemicals and can include mechanical agitation devices.

Meters and shut-off valves can be provided on the piping and tubing containing the flow of chemically injected solids.

Turning now to FIG. 10, there is shown an alternative arrangement for separating the material from the mixing tube into sludge and clear water. The apparatus includes a separating chamber 90 having primarily an inclined screen 91 with the mixed material supplied to the top edge of the screen by a weir 92 from a tank 93 supplied by a pipe 94 from the mixing tube. The inclined screen is perforated so that water falls through into a collection tank 95. At the bottom edge of the screen is provided a sludge collection tank 96 from which the sludge is pumped by the pump 11F.

The screen 91 is formed from a type of material known as "wedge wire" screen so that it has an array of holes through the screen through which the water can pass. However to prevent or inhibit the passage of solid material from the sludge, the front or top surface of the screen has projections or serrations which act to trap water for passage through the holes and prevent passage of the sludge.

Another type of separation system which can be used comprises a cylindrical tube formed of "wedge wire" screen within which is rotated an auger flight which is formed of a helical flight with an edge brush on the flight extending helically along the full length of the flight so as to brush over the interior surface of the screen tube and to wipe of the solids collecting on the surface while the water is squeezed through the screen by the internal pressure generated by the auger flight. Thus the water is pressed through the screen and collected outside the screen while the solids or flocculent are carried along the tube by the flight and discharged at the remote end of the tube for collection.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. Apparatus for water treatment comprising:
   an inlet for waste water to be treated;
   a mixing tube assembly for receiving the waste water from the inlet and through which the waste water passes to an outlet of the mixing tube assembly for mixing into the waste water a plurality of chemicals for causing flocculation of contaminants in the waste water;
   and a separating chamber connected to the outlet of the mixing tube assembly for receiving the waste water and the chemicals mixed therein for separating the flocculated contaminants and for supplying clarified water at an outlet of the separating chamber, said separating chamber comprising an inclined perforated screen with a water supply system at the top edge of the screen for receiving water and contaminants from the mixing chamber and supplying them across the screen for flowing over the screen, a sludge collecting tank at a bottom edge of the screen and a water collection tank underneath the screen for collecting water passing through the screen;
   wherein the mixing tube assembly comprises:
      a duct with an inlet at one end and the outlet at the other end;
      a plurality of injection members at spaced positions along the duct each including a pump and a chemical supply for injecting a selected quantity of a selected chemical into the duct;
      and a plurality of mixing members in the duct at spaced positions therealong arranged such that each injection member is associated with a respective mixing member for mixing the chemical into the water in the duct.

2. The apparatus according to claim 1 wherein each of the mixing members comprises a motor mounted on an outside of the duct, a drive shaft of the motor extending from the motor through a wall of the duct in a direction generally at right angles to the duct, a body driven by the shaft for rotation within the duct including a plurality of beater paddles or blades thereon and a chemical injector mounted on the duct at the shaft for receiving chemicals and injecting the chemicals into the water within the duct.

3. The apparatus according to claim 2 wherein the chemicals are injected at the drive shaft.

4. The apparatus according to claim 2 wherein the chemicals are injected through a hollow interior of the drive shaft.

5. The apparatus according to claim 2 wherein the chemicals are injected through a tube surrounding the drive shaft.

6. The apparatus according to claim 5 wherein the chemicals are injected through a fixed nozzle connected to the tube surrounding the drive shaft.

7. The apparatus according to claim 2 wherein the chemicals are injected through a rotating body attached to the drive shaft.

8. The apparatus according to claim 1 wherein there is provided a filter system for filtering the clarified water from the outlet of the separating chamber.

9. The apparatus according to claim 1 wherein there is provided an electrical separation assembly comprising a container into which the water is introduced and a plurality of plates within the container arranged to be charged at low voltage; the plates being formed of an amorphous metal.

10. The apparatus according to claim 9 wherein the plates are parallel.

11. The apparatus according to claim 9 wherein the plates are arranged across a duct with holes through the plates for passage of water along the duct.

12. The apparatus according to claim 1 wherein the sludge collecting tank has an auger for removal of collected sludge.

13. The apparatus according to claim 9 wherein the plates are arranged in groups where each alternate group is oppositely charged.

14. The apparatus according to claim 13 wherein the charge is at the order of 12 volts.

15. Apparatus for water treatment comprising:

an inlet for waste water to be treated;

a mixing tube assembly for receiving the waste water from the inlet and through which the waste water passes to an outlet of the mixing tube assembly for mixing into the waste water a plurality of chemicals for causing flocculation of contaminants in the waste water;

and a settling chamber connected to the outlet of the mixing tube assembly for receiving the waste water and the chemicals mixed therein for allowing settling of the flocculated contaminants and for supplying clarified water at an outlet of the settling chamber;

wherein there is provided an electrical separation assembly comprising a container into which the clarified water is introduced and a plurality of plates within the container arranged to be charged at low voltage; the plates being formed of an amorphous metal.

16. The apparatus according to claim 15 wherein the plates are parallel.

17. The apparatus according to claim 15 wherein the plates are arranged across a duct with holes through the plates for passage of water along the duct.

18. The apparatus according to claim 17 wherein the duct has an auger along a bottom part of the duct for removal of collected sludge.

19. The apparatus according to claim 15 wherein the plates are arranged in groups where each alternate group is oppositely charged.

20. The apparatus according to claim 19 wherein the charge is at the order of 12 volts.

* * * * *